United States Patent
Sasaki et al.

(10) Patent No.: US 8,421,430 B2
(45) Date of Patent: Apr. 16, 2013

(54) DIGITAL CONTROL SWITCHING POWER SUPPLY UNIT

(75) Inventors: Masahiro Sasaki, Matsumoto (JP); Tetsuya Kawashima, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 316 days.

(21) Appl. No.: 12/962,391

(22) Filed: Dec. 7, 2010

(65) Prior Publication Data

US 2011/0133712 A1    Jun. 9, 2011

(30) Foreign Application Priority Data

Dec. 8, 2009    (JP) ................................. 2009-278682

(51) Int. Cl.
    *G05F 1/00* (2006.01)
(52) U.S. Cl.
    USPC ........... 323/283; 327/148; 327/149; 327/158; 327/159
(58) Field of Classification Search .................. 323/222, 323/271, 282, 283, 284; 327/147, 148, 149, 327/150, 156, 157, 158, 159
    See application file for complete search history.

(56) References Cited

U.S. PATENT DOCUMENTS

| | | | |
|---|---|---|---|
| 6,958,721 B2 | 10/2005 | Vincent et al. | |
| 8,319,486 B2* | 11/2012 | Maksimovic et al. | 323/283 |
| 2003/0093160 A1 | 5/2003 | Maksimovic et al. | |
| 2004/0155696 A1* | 8/2004 | Gauthier et al. | 327/530 |
| 2006/0038596 A1* | 2/2006 | Wang | 327/158 |
| 2006/0055574 A1 | 3/2006 | Maksimovic et al. | |
| 2008/0252277 A1 | 10/2008 | Sase et al. | |
| 2010/0085099 A1* | 4/2010 | Ma | 327/295 |

FOREIGN PATENT DOCUMENTS

| | | |
|---|---|---|
| JP | 2005-512493 T2 | 4/2005 |
| JP | 2008-113542 A | 5/2008 |

* cited by examiner

*Primary Examiner* — Nguyen Tran

(74) *Attorney, Agent, or Firm* — Rossi, Kimms & McDowell LLP

(57) ABSTRACT

A digital control switching power supply unit includes an A/D converter circuit having a delay line circuit that has a delay element array whose delay time is controlled by a bias current, and that converts a current value into a digital signal using a signal transmission delay time, a phase difference detector circuit that detects a phase difference between a switching cycle and an A/D conversion cycle, a charge pump circuit that generates a control voltage in accordance with the phase difference, and a bias current indicator circuit that determines a bias current in accordance with an output voltage of the charge pump circuit and a result of a comparison of a detected value of the output voltage and a reference voltage, wherein the digital control switching power supply unit controls in such a way that the A/D conversion cycle is synchronized with the switching cycle.

8 Claims, 13 Drawing Sheets

Case of Variable Frequency

DIGITAL CONTROL SWITCHING POWER SUPPLY UNIT

BACKGROUND OF THE INVENTION

1. Technical Field

The present invention relates to a switching power supply unit that performs a voltage conversion by carrying out a switching in accordance with a pulse width modulation signal (hereafter called a PWM signal), and in particular, relates to a digital control switching power supply unit having an analog-to-digital converter circuit (hereafter called an A/D converter circuit) preferable for control using a digital signal.

2. Related Art

FIG. 12 shows a first configuration example of a heretofore known common digital control switching power supply unit. The digital control switching power supply unit shown in FIG. 12, being a configuration example of a digital control switching power supply unit of a voltage mode wherein a switching element is controlled by a PWM signal and an input voltage Vin is converted to an output voltage Vout, is configured of a subtraction circuit Sub, an A/D converter circuit 12, a digital compensation circuit 22, a digital PWM circuit 32, a switching circuit 41 including a drive circuit DRV and a P-channel MOSFET (hereafter called a PMOS) Q1 and N-channel MOSFET (hereafter called an NMOS) Q2, which are a pair of switching elements controlled by the drive circuit DRV, and an LC smoothing filter 51 including an inductor L and a capacitor C. Also, Vin is a power supply that inputs an input voltage Vin into the digital control switching power supply unit (a power supply and its voltage are given the same reference numerals and characters), and RL is a load circuit.

In the configuration of FIG. 12, a detected value of the output voltage Vout (the output voltage itself, the output voltage divided, the output voltage level shifted, or the like) is fed back, and an error voltage Ve ((Vref−Vout), (Vref−K1·Vout), (Vref−(Vout−K2)), or the like, where K1 and K2 are positive constants) between the detected value and a reference value Vref, which is a target value, is generated by the subtraction circuit Sub. The error voltage Ve is sampled in the A/D converter circuit 12 for each switching cycle Ts, and converted into a digital error signal e(n) (herein, (n) indicates that it is a signal in an $n^{th}$ switching cycle). The digital compensation circuit 22 performs a proportional integral and differential (PID) process on the input digital error signal e(n), and calculates a duty command signal dc(n) that controls the duty of the PWM signal. The digital PWM circuit 32 generates the PWM signal based on the calculated duty command signal dc(n). The switching circuit 41 on-off controls the switching elements Q1 and Q2 in accordance with the PWM signal, and the LC smoothing filter 51 smoothes an output of the switching circuit 41, generates the output voltage Vout, and supplies it to the load circuit RL.

Herein, as only a small number of bits are necessary in order to express a conversion range or conversion result of the A/D converter circuit in the case of the specifications of the common switching power supply unit, a delay line A/D converter (ADC), which utilizes an element delay time that changes depending on an operating voltage or operating current, is used in the digital control switching power supply unit (for example, refer to JP-T-2005-512493).

FIG. 13 shows a configuration example of a heretofore known delay line ADC. The delay line ADC is configured of a delay time adjusting delay element dmy, a delay element array d1 to d(n) configured of n stages of delay elements Dcell connected in series, n flip-flops DFF that store an output of each delay element Dcell at a rising edge of a data storage signal Sample, and an encoder circuit 5 that generates the digital error signal e(n) from an output of the n flip-flops DFF.

In FIG. 13, the delay element dmy is inserted with the object of adjusting the overall delay time, in order to optimize the delay time of the delay element array d1 to d(n). Also, a control signal Dcont is a signal for controlling the delay times of the delay element dmy and the delay elements Dcell.

FIGS. 14A and 14B show a timing chart of the delay line ADC shown in FIG. 13. The delay line ADC carries out an A/D conversion operation for each switching cycle Ts (a cycle of a switching clock CLK-SW, which is a basic clock) of the switching power supply unit. The A/D conversion operation starts at the rise of an A/D conversion start signal Start synchronized with the switching clock CLK-SW, and is reset and finished at the decay of the signal.

FIG. 14A shows a timing chart in the case of a normal frequency. On the A/D conversion start signal Start being input into the delay element dmy, that is, on the input of the delay element dmy changing to an H (high) level, the H level is delayed by a delay time tdd by the delay element dmy, transmitted to the delay element d1 at the first stage of the delay element array, then transmitted sequentially through the delay element array d1 to d(n) while being delayed in each delay element by a constant delay time td. Outputs d1 to d(n) (an element and its output are given the same reference numerals and characters) of the delay elements Dcell are stored in the n flip-flops DFF at the rise of the data storage signal Sample, whose timing is set in advance. Then, by output data out1 to out(n) of the n flip-flops DFF representing the stored d1 to d(n) being encoded by the encoder circuit 5, the digital error signal e(n) is obtained. Herein, the data out1 to out(n) are such that the first k items of data out1 to out(k) are H level, while the remaining items of data out(k+1) to out(n) are L (low) level signals. Then, when the value of the control signal Dcont is such as to lengthen the delay times of the delay element dmy and delay elements Dcell, the number of delay elements through which the H level is transmitted decreases, meaning that the value of k decreases, while when the value of the control signal Dcont is such as to shorten the delay times, the number of delay elements through which the H level is transmitted increases, meaning that the value of k increases. In this way, the delay line ADC realizes the A/D conversion in accordance with the control signal Dcont by controlling the storage timing with the delay times tdd and td and the data storage signal Sample.

Then, the total time of the A/D conversion time and digital compensation circuit 22 duty command signal dc(n) calculation time has to be set so as to be equal to or shorter than the switching cycle Ts (operating times of the subtraction circuit Sub and digital PWM circuit 31 can be ignored).

For this reason, in order to reliably complete the A/D conversion and duty command signal dc(n) calculation within the switching cycle Ts, even in the event of a variation in the switching cycle Ts or delay time occurring due to the effect of a process fluctuation or a variation in element size, it is necessary to secure a temporal margin.

Furthermore, in a case of making the switching frequency variable, and the frequency settable on a user side, it is necessary to set in such a way that the A/D conversion and duty command signal dc(n) calculation are completed within a minimum switching cycle stipulated by the specifications. FIG. 14B shows a timing chart wherein the A/D conversion and duty command signal calculation are possible at a switching frequency up to two times higher, but the necessary margin is extremely large.

With the digital control switching power supply unit, as a digital signal processing such as a PID calculation is necessary, a feedback control takes longer than with an analog control method, and it is known that there is a problem with transient response characteristics. When applying this delay line ADC to a switching power supply unit, it is necessary to secure a temporal margin as heretofore described, and the delay time further increases. As the temporal margin is the delay time until an A/D conversion result is reflected in the PWM signal, the kind of excessive margin time shown in FIG. 14B delays feedback to the output of an A/D conversion result, and the transient response characteristics of the switching power supply unit are worsened considerably.

As a digital control switching power supply unit that improves the transient response characteristics, a circuit structure wherein a transient fluctuation detector circuit for a time of sudden load change is newly provided in addition to the normal digital signal processing circuit, and an output voltage is controlled without going through a digital signal processing at a time of sudden load change, is introduced in JP-A-2008-113542.

FIG. 15 shows a circuit configuration of the digital control switching power supply unit described in JP-A-2008-113542 as a second configuration example of a heretofore known digital control switching power supply unit. The same reference numerals and characters are given to places which are the same as in the first configuration example of a heretofore known digital control switching power supply unit shown in FIG. 12, and a detailed description will be omitted.

The digital control switching power supply unit shown in FIG. 15 is configured of a digital signal processing circuit portion 61, the switching circuit 41, the LC smoothing filter 51, a transient fluctuation detector circuit 71 including two comparators CP1 and CP2, and a CR filter 81 including a resistor R2 and a capacitor C2.

The digital signal processing circuit portion 61 is configured of an A/D converter circuit 13, a digital voltage control circuit 23, a digital PWM circuit 33, a Vref±Δ circuit 62 that outputs voltages of reference voltages Vref+Δ and Vref−Δ, and an SEL circuit 63 that selects and outputs a PWM signal at a normal time or at a time of a sudden load change.

At a time of a normal operation (Vref+Δ>Vout>Vref−Δ), a digital signal processing is carried out in the A/D converter circuit 13, digital voltage control circuit 23, and digital PWM circuit 33, and a PWM signal, which is an output of the digital PWM circuit 33, is selected and output to the switching circuit 41 via the SEL circuit 63. That is, the same kind of switching control operation as in the heretofore known first configuration example shown in FIG. 12 is carried out.

Meanwhile, an operation at a time of a sudden load change is such that a sudden load change voltage VoCR detected by the CR filter 81, and the voltages Vref±Δ which are references, are compared by the comparators CP1 and CP2 of the transient fluctuation detector circuit 71, and a drive control method of the switching circuit 41 is selected.

Firstly, in the case of a time of a sudden load reduction (Vout>Vref+Δ), the SEL circuit 63 is controlled by a detection signal α0 of the comparator CP1, and a 0% duty PWM signal is selected and output, thus driving the switching circuit 41. Next, in the case of a time of a sudden load increase (Vout<Vref−Δ), the SEL circuit 63 is controlled by a detection signal α100 of the comparator CP2, and a 100% duty PWM signal is selected and output, thus driving the switching circuit 41. By means of the heretofore described operations, the transient response characteristics of the output voltage Vout at a time of a sudden load change are improved.

The following kinds of problem exist with the heretofore described heretofore known digital control switching power supply units.

Firstly, with the heretofore known first configuration example shown in FIG. 12, there is a problem in that a temporal margin is needed in the A/D conversion cycle, and there occurs a delay time until the PWM signal is generated based on the digital error signal e(n), wherein the error voltage between the output voltage Vout and reference voltage Vref is A/D converted by the delay line ADC, and the output voltage Vout is controlled, and the transient response characteristics of the output worsen. In order to improve the transient response characteristics, a quickening of the switching cycle Ts is also conceivable, but a problem also occurs in that a quickening of the elements used is also inevitably required, expensive elements become necessary, and the current consumed increases along with the quickening.

Also, with the heretofore known second configuration example shown in FIG. 15, a quickening of the transient response characteristics is realized by providing the transient fluctuation detector circuit 71, the CR filter 81, and the like, separate from the normal digital signal processing circuit, and controlling with a 0% or 100% duty PWM signal at a time of a sudden load change of the output voltage Vout. However, there is a problem in that a dedicated detector circuit or circuit parts are newly necessary at a time of a sudden load change, and the circuit scale becomes enormous. Also, there is a problem in that signal controls of an operation at a normal time and an operation at a time of a sudden load change become complicated, and furthermore, it is necessary to individually set a sudden load change detection voltage and the voltage range Vref±Δ, which forms a reference, in accordance with the specifications of the switching power supply unit.

SUMMARY OF THE INVENTION

Embodiments of the invention, having been contrived bearing in mind the heretofore described problems, have an object of realizing an A/D converter circuit that optimizes an A/D conversion operation in accordance with a switching cycle, and maintains the operation in a steady condition, and of providing a digital control switching power supply unit whose transient response characteristics are good due to applying the A/D converter circuit.

In order to achieve the heretofore described object, according to a first aspect of the invention, a digital control switching power supply unit that converts an input voltage into a desired output voltage using a pulse width modulation signal includes an analog-to-digital converter circuit that includes a delay line circuit that has a first delay element array wherein delay elements whose delay times are controlled by a bias current are connected in series, and that converts a current value of the bias current flowing through the delay elements of the first delay element array into a digital value using a delay time of a start signal transmitted through the first delay element array; a phase difference detector circuit that detects a phase difference between a switching cycle fixed by the pulse width modulation signal and a cycle of an analog-to-digital conversion wherein the delay line circuit converts the current value of the bias current into a digital value; a charge pump circuit that generates a bias control voltage for generating the bias current in accordance with an output of the phase difference detector circuit; and a bias current indicator circuit that determines the bias current based on an output of the charge pump circuit, and on a result of a comparison of a detected value of the output voltage and a reference voltage.

Also, according to a second aspect of the invention, the delay line circuit includes a first delay cell array that has a first delay element array wherein delay elements through which a delay output current flows as the bias current, and whose delay times are controlled by the delay output current, are connected in series, and a memory circuit that stores an output of the delay elements configuring the first delay element array using a timing signal, a second delay cell array that has a second delay element array wherein delay elements through which a delay reference current flows as the bias current, and whose delay times are controlled by the delay reference current, are connected in series, and that generates the timing signal and a signal indicating the conversion cycle, and an encoder circuit that encodes an output of the memory circuit.

Also, according to a third aspect of the invention, the phase difference detector circuit includes a circuit that, with the switching cycle as a reference, detects a difference in phase with that of the conversion cycle, and outputs an Up signal for a period in which there is a phase difference when the phase of the switching cycle is earlier, and a circuit that, with the switching cycle as a reference, detects a difference in phase with that of the analog-to-digital conversion cycle, and outputs a Dwn signal for a period in which there is a phase difference when the phase of the switching cycle is later.

Also, according to a fourth aspect of the invention, the charge pump circuit includes a charging circuit that generates a charge current by copying a reference current, and charges a charge pump capacitor with the charge current for the period for which the Up signal is being output, a discharging circuit that generates a discharge current by copying the reference current, and discharges the charge pump capacitor with the discharge current for the period for which the Dwn signal is being output, and an output circuit that outputs the bias control voltage in accordance with a charge/discharge voltage of the charge pump capacitor.

Also, according to a fifth aspect of the invention, the bias current indicator circuit includes a constant current circuit that generates a constant current in accordance with the bias control voltage, a first differential circuit that, with a current wherein the constant current is copied as an operating current and with the detected value of the output voltage and the reference voltage as inputs, outputs a signal determining the delay output current, and a second differential circuit that, with a current wherein the constant current is copied as an operating current and with signals of the same potential as two inputs, outputs a signal determining the delay reference current.

With the digital control switching power supply unit according to the invention, as the A/D converter circuit carries out a conversion operation controlled by a continuous analog signal and in synchronization with the switching cycle, an advantage is achieved in that the transient response characteristics are improved with a simple circuit configuration and control method.

DETAILED DESCRIPTION OF THE EMBODIMENTS

First Embodiment

Figure 1:
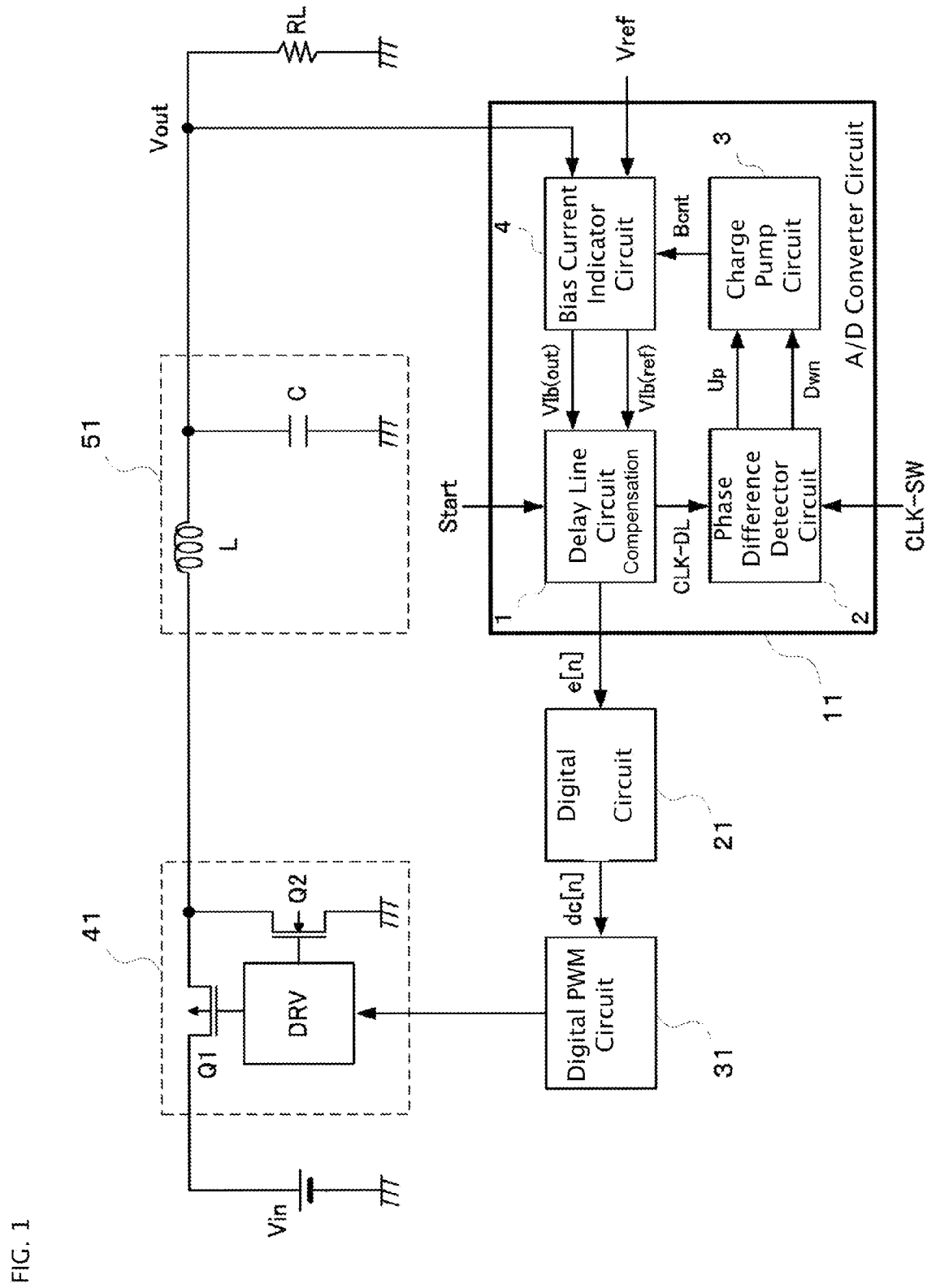
FIG. 1 is a diagram showing a configuration example of a digital control switching power supply unit according to the invention.

Hereafter, a description will be given, while referring to the drawings, of a digital control switching power supply unit according to an embodiment of the invention.

Figure 12:
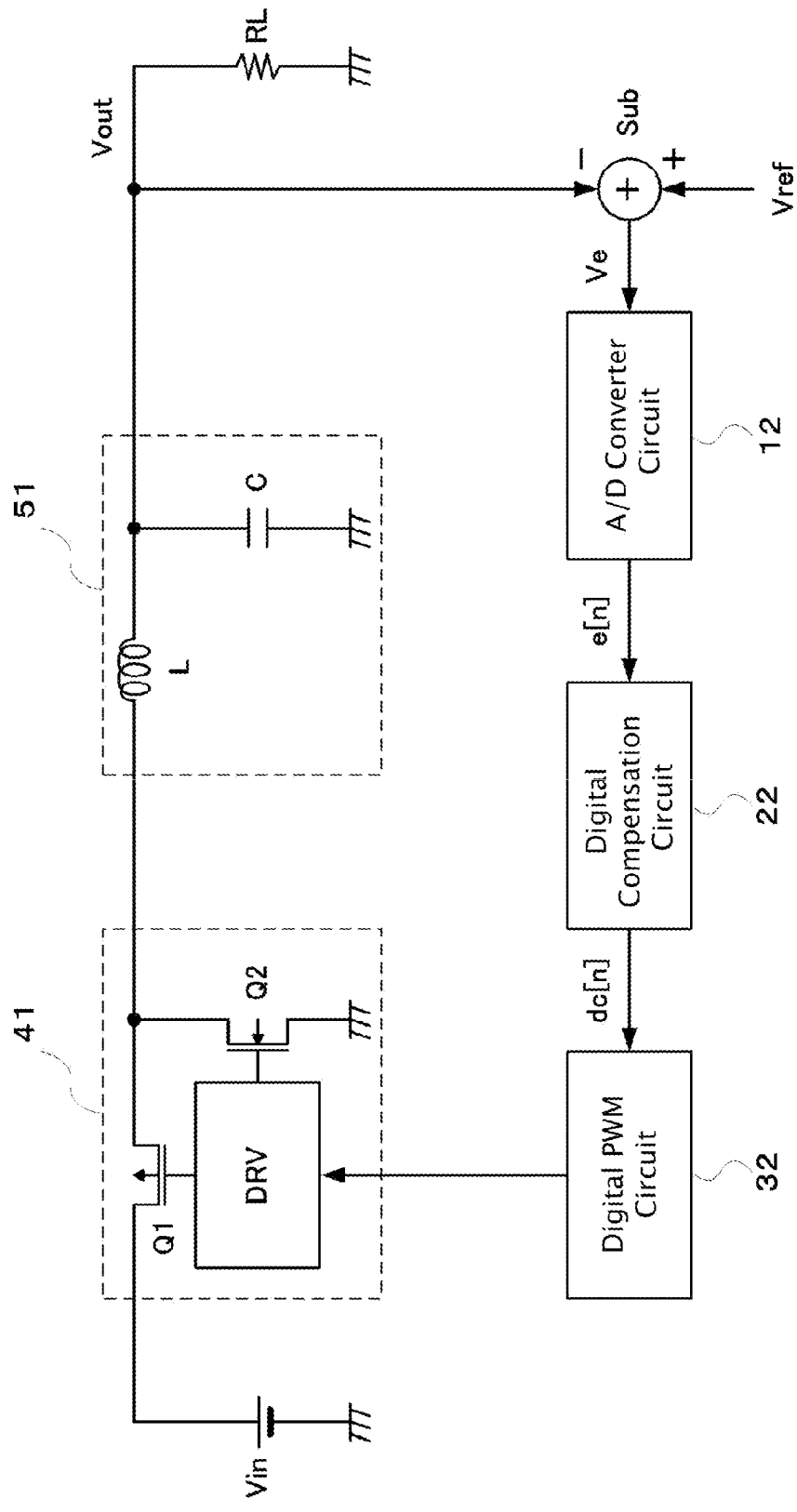
FIG. 12 is a diagram showing a first configuration example of a heretofore known digital control switching power supply unit.
Figure 13:
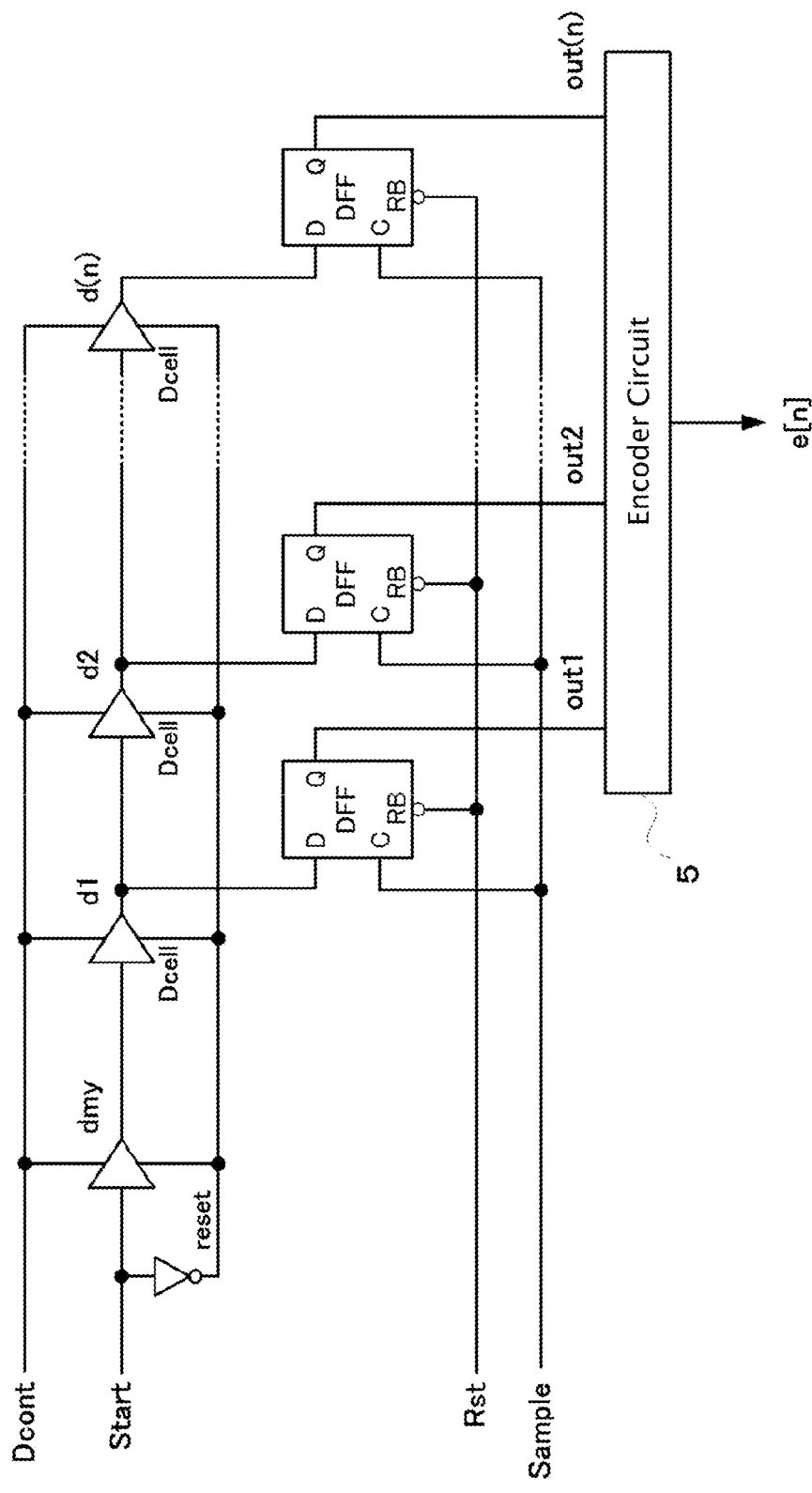
FIG. 13 is a diagram showing a circuit configuration example of a delay line ADC in the first configuration example of the heretofore known digital control switching power supply unit.
Figure 14A:
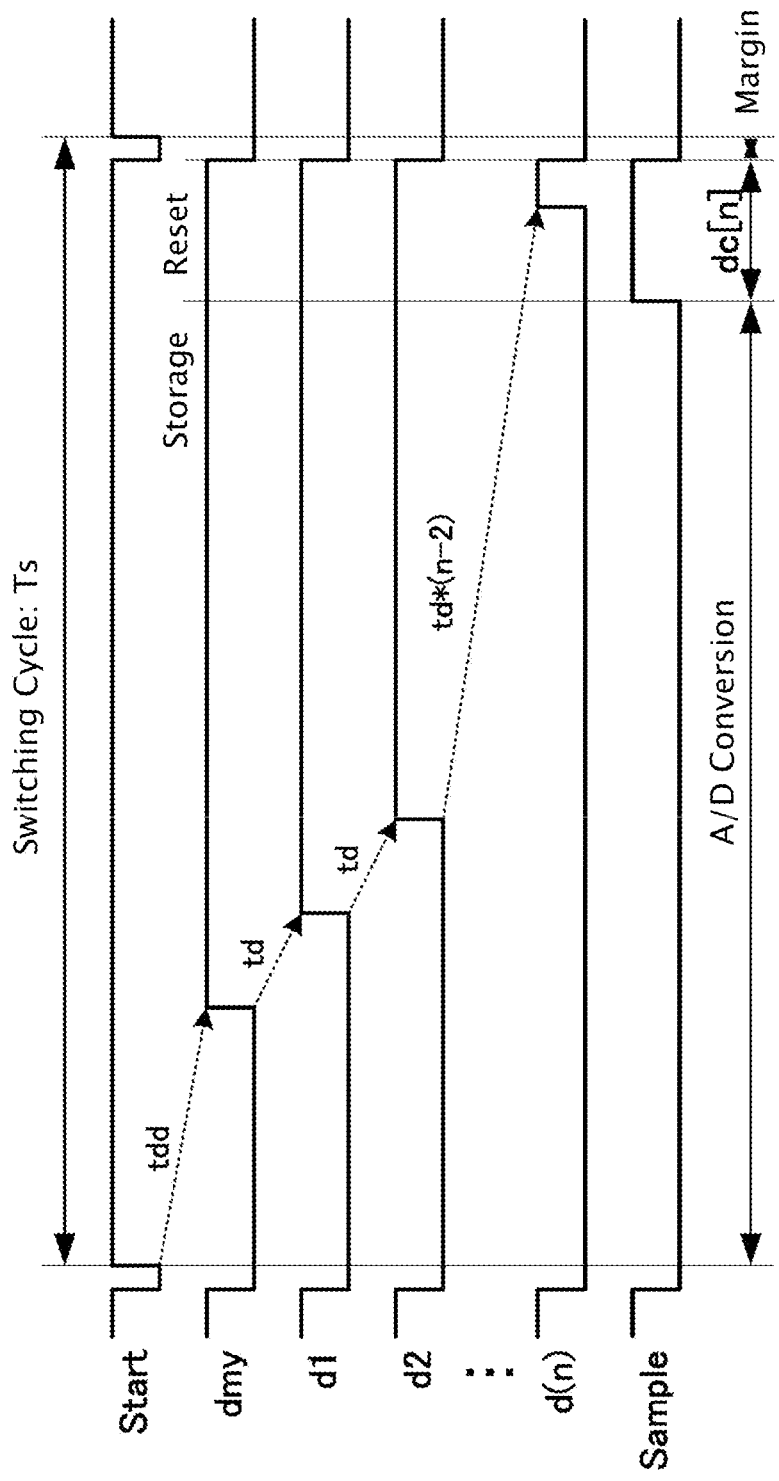
FIGS. 14A and 14B are diagrams showing a timing chart of the delay line ADC in the first configuration example of the heretofore known digital control switching power supply unit.
Figure 14B:
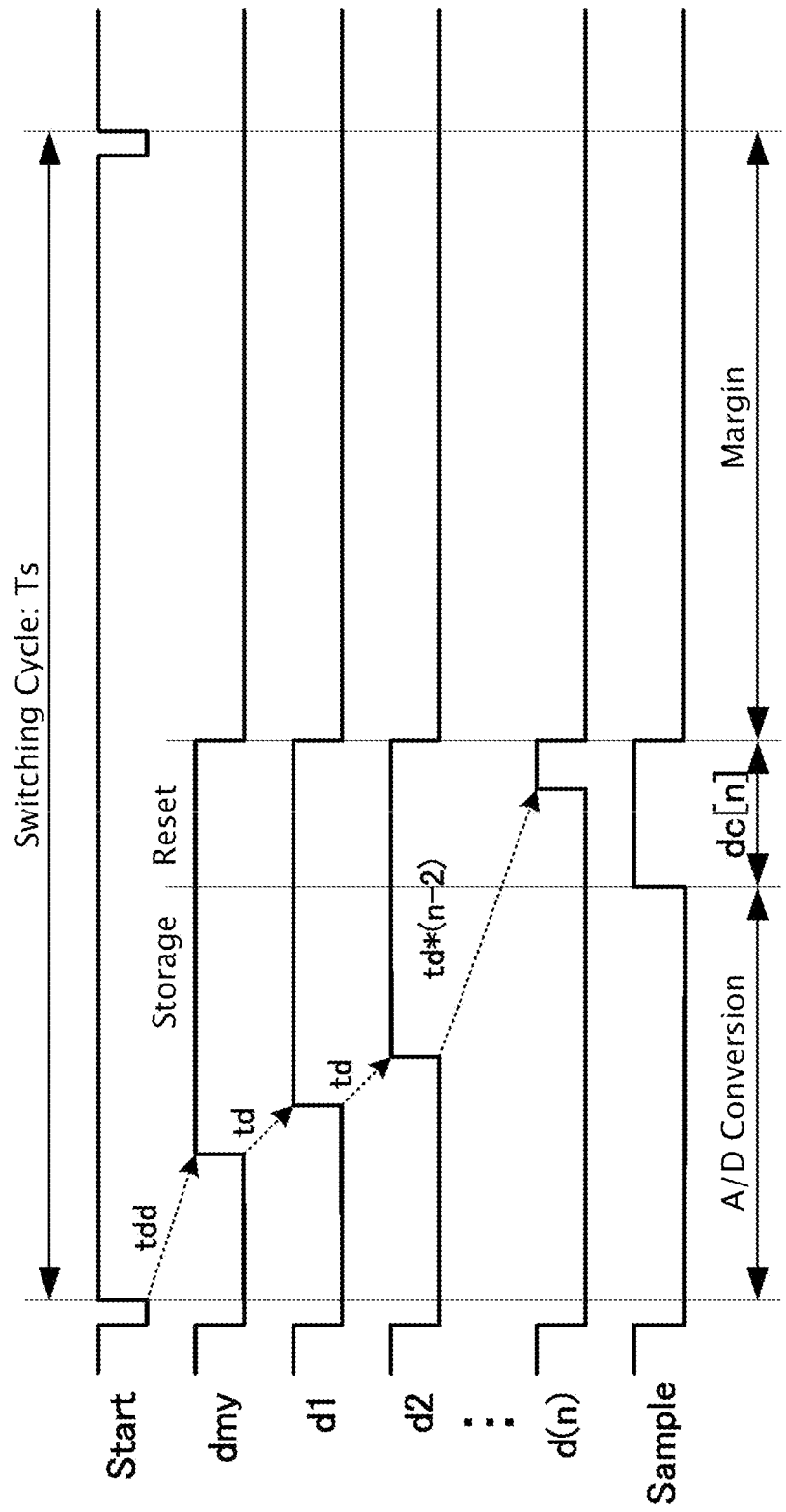
Figure 15:
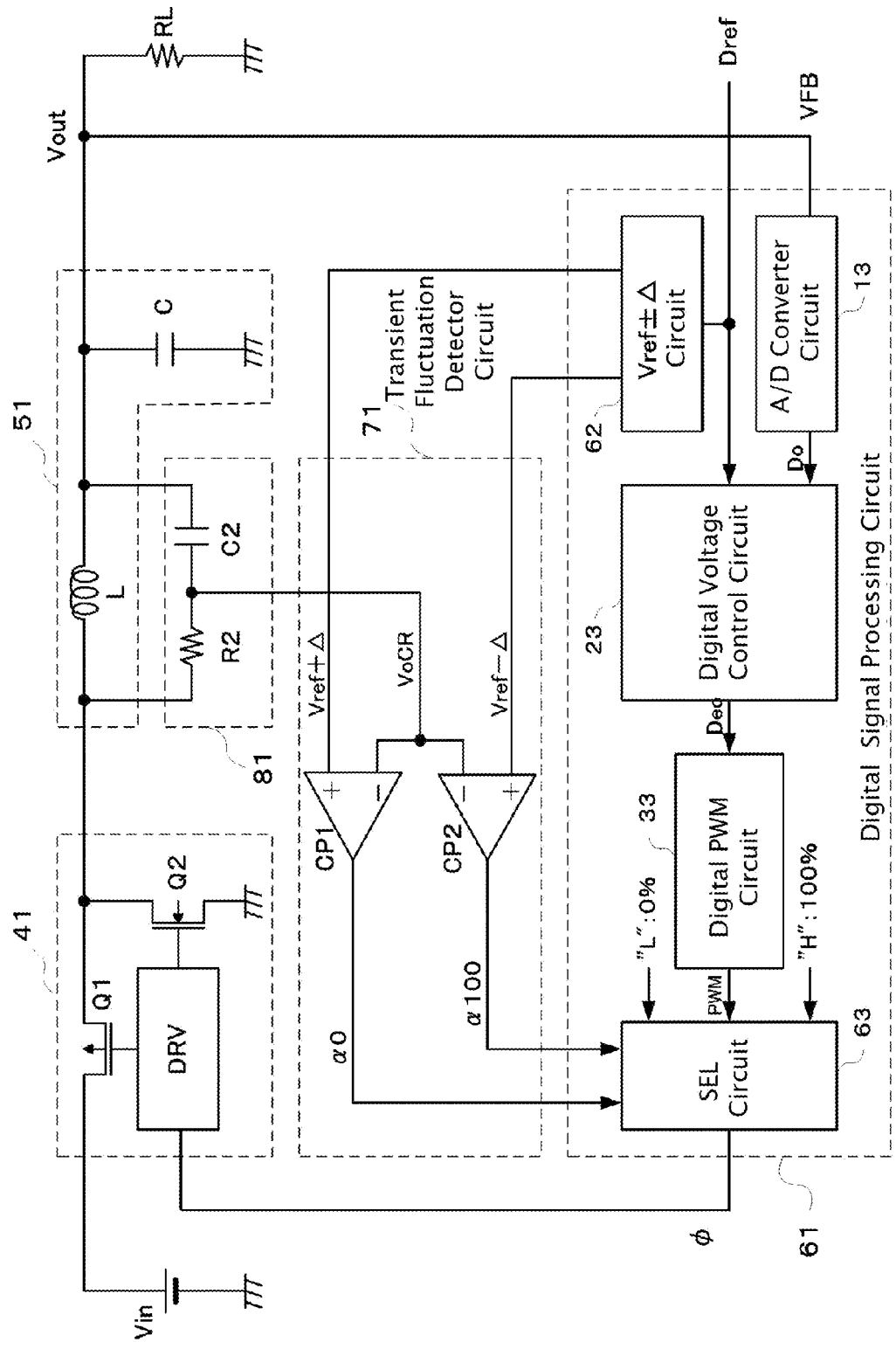
FIG. 15 is a diagram showing a second configuration example of a heretofore known digital control switching power supply unit.

FIG. 1 is a block diagram showing a configuration of an embodiment of a digital control switching power supply unit according to the invention. The same reference numerals and characters will be given to places the same as those in the configuration examples of heretofore known digital control switching power supply units shown in FIGS. 12 and 15, and a detailed description will be omitted.

FIG. 1 is an example of a configuration of a digital control switching power supply unit of a voltage mode that converts an input voltage Vin into an output voltage Vout by controlling a switching element with a PWM signal, and is configured of an A/D converter circuit 11, a digital compensation circuit 21, a digital PWM circuit 31, a switching circuit 41, and an LC smoothing filter 51. An operation of the digital control switching power supply unit shown in FIG. 1 being the same as that of the heretofore known digital control switching power supply unit shown in FIG. 12, details will be omitted.

In the digital control switching power supply unit of the embodiment shown in FIG. 1, the A/D converter circuit 11 includes a delay line circuit 1, a phase difference detector circuit 2, a charge pump circuit 3, and a bias current indicator circuit 4.

The delay line circuit 1, having a delay element array whose delay time is controlled by a delay control current signal including a delay output current signal VIb(out) and a delay reference current signal VIb(ref), carries out an A/D conversion of an error voltage between a detected value of an output voltage Vout and a reference voltage Vref which forms a target value, utilizing a delay time in which an A/D conversion start signal Start is transmitted through the delay element array, and outputs a digital error signal e(n) corresponding to the error voltage, and a delay line clock CLK-DL indicating an A/D conversion cycle.

Figure 2:
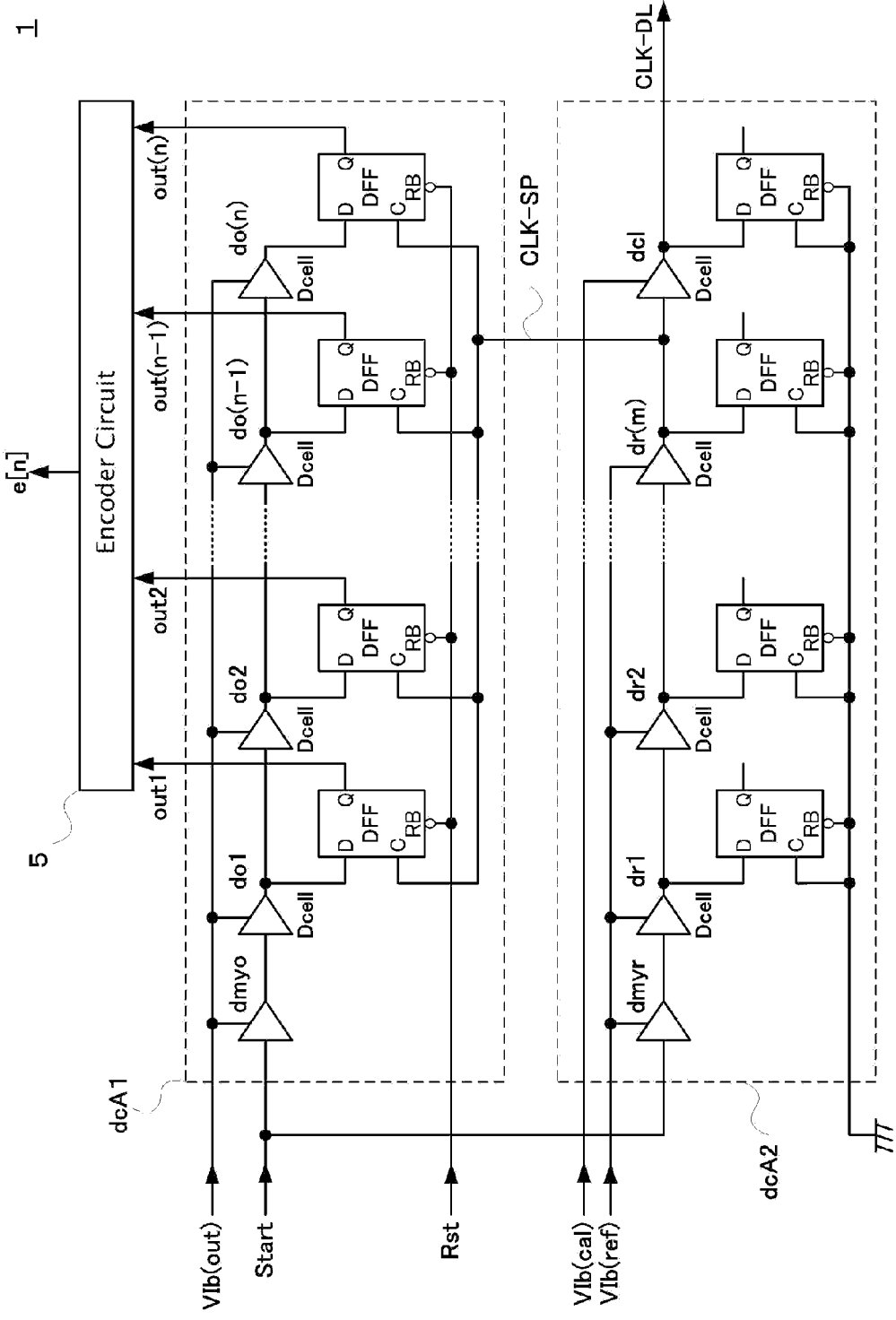
FIG. 2 is a diagram showing a circuit configuration example of a delay line circuit according to an embodiment of the invention.

FIG. 2 is an example of a circuit configuration of the delay line circuit 1 of the embodiment. The delay line circuit 1 shown in FIG. 2 includes two delay cell arrays dcA1 and dcA2, and an encoder circuit 5.

The delay cell array dcA1 includes a delay time adjusting delay element dmyo into which the A/D conversion start signal Start is input, a delay element array do1 to do(n) configured of n stages of delay elements Dcell connected in series, and n flip-flops DFF that store data of outputs do1 to do(n) of the delay element array (an element and its output are given the same reference numerals and characters) at a rising edge of a timing signal CLK-SP. The delay output current signal VIb(out) controls delay times tddo and tdo in which the A/D conversion start signal Start is transmitted through the delay element dmyo and delay element array do1 to do(n). That is, the delay output current signal VIb(out) is converted into a delay output current Ib(out) in a way to be described hereafter, and the delay output current Ib(out) is converted into the delay times tddo and tdo. By storing the outputs do1 to do(n) of the delay element array at the rise of the timing signal CLK-SP, generated after a predetermined time, in the n flip-flops DFF, it is possible to obtain data outputs out1 to out(n) wherein the delay output current signal VIb(out) is converted into a digital signal. That is, the data outputs out1 to out(n) are such that the first k data outputs out1 to out(k) are 1, while the remaining data outputs out(k+1) to out(n) are 0 but, as will be described hereafter, the larger the delay output current signal VIb(out), the smaller k becomes.

The encoder circuit 5 encodes the data outputs out1 to out(n), and generates and outputs the digital error signal e(n).

Meanwhile, the delay cell array dcA2 includes a circuit portion that generates the delay cell array dcA1 data storage timing signal CLK-SP, and a circuit portion that generates the delay line clock CLK-DL indicating the A/D conversion cycle.

The circuit portion that generates the data storage timing signal CLK-SP includes a delay time adjusting delay element dmyr into which the A/D conversion start signal Start is input, a delay element array dr1 to dr(m) configured of m stages of delay elements Dcell connected in series, and m flip-flops DFF into which outputs dr1 to dr(m) of the delay element array (an element and its output are given the same reference numerals and characters) are input. The delay reference current signal VIb(ref) controls delay times tddr and tdr in which the A/D conversion start signal Start is transmitted through the delay element dmyr and delay element array dr1 to dr(m). That is, the delay reference current signal VIb(ref) is converted into a delay reference current Ib(ref) in a way to be described hereafter, the delay reference current Ib(ref) is converted into the delay times tddr and tdr, and an output dr(m) forms the timing signal CLK-SP.

The circuit portion that generates the delay line clock CLK-DL includes a delay element dcl into which the timing signal CLK-SP is input, and the flip-flop DFF into which the output of the delay element dcl is input. A delay time tdcl of the delay element dcl is a time which is a calculation time for the digital compensation circuit 21 to calculate a duty command signal dc(n), which controls the duty of the PWM signal, based on the digital error signal e(n), and is controlled by a delay calculation current signal VIb (cal) indicating the bias current of the delay element dcl. As the delay calculation current signal VIb (cal) can be set without depending on a switching cycle, it is generated in a circuit separate from the bias current indicator circuit 4.

The time from the A/D conversion start signal Start being input until the delay line clock CLK-DL is output is a time wherein an A/D conversion time in the delay line circuit 1 and the duty command signal dc(n) calculation time in the digital compensation circuit 21 are added together, and forms a signal indicating the A/D conversion cycle.

In the delay line circuit 1 shown in FIG. 2, in order to balance variations in the delay times of the delay element arrays of the delay cell arrays dcA1 and dcA2, a flip-flop DFF that does not operate is connected to the delay cell array dcA2 too, and the wire resistance and parasitic capacitance of the two delay cell arrays are matched.

Figure 3:
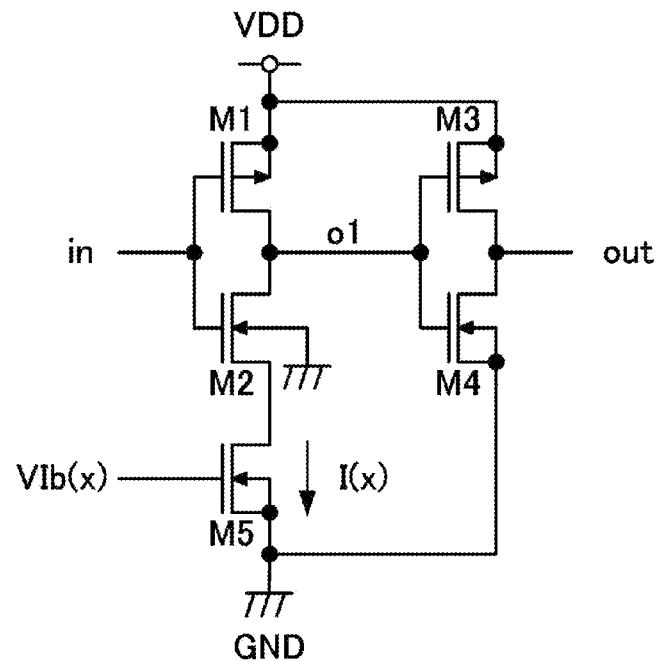
FIG. 3 is a diagram showing a circuit configuration example of a delay element according to the embodiment of the invention.

FIG. 3 is a diagram showing one example of a basic configuration of the delay elements Dcell used in the delay cell arrays dcA1 and dcA2 of the embodiment. The delay elements Dcell are configured of a buffer circuit wherein inverters formed of one pair of PMOSs and NMOSs are connected in two-stage series between a power supply potential VDD and a reference potential GND, and an NMOS (M5) controlled by a delay control current signal VIb(x) is inserted between an NMOS (M2) of the first stage inverter and the reference potential GND. By a current flowing through the NMOS (M2) being controlled to a constant current I(x) by the delay control current signal VIb(x), a delay time of an output signal out with respect to an input signal in is stipulated. The delay output current signal VIb(out) and delay reference current signal VIb(ref) are provided as the delay control current signal VIb(x) to each of the delay elements Dcell of the delay cell arrays dcA1 and dcA2, by which means the values of the delay output current Ib(out) and delay reference current Ib(ref) flowing through the delay elements Dcell of the delay cell arrays dcA1 and dcA2 are indicated.

Figure 4:
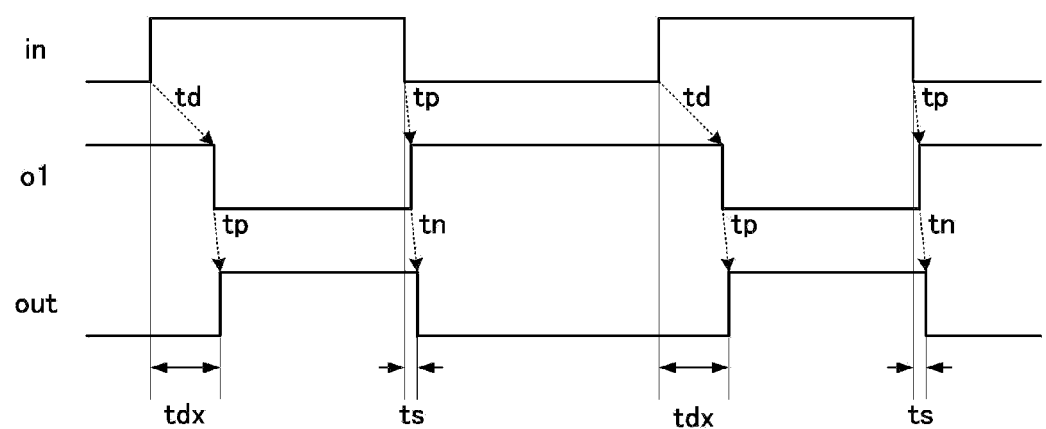
FIG. 4 is a diagram showing a timing chart of an input-output of the delay element according to the embodiment of the invention.

FIG. 4 shows a timing chart of the delay element Dcell shown in FIG. 3. An output signal o1 of the first stage inverter being a signal wherein the input signal in is inverted, the decay of the output signal o1 is delayed by a delay time td for which the NMOS (M2) is controlled by the delay control current VIb(x), and the delay of its rise is a switching delay time tp of a PMOS (M1). The delay time td is a time from the start of a discharge of a gate capacitor charge of a PMOS (M3) and NMOS (M4) due to the constant current I(x) until the gate potential of the PMOS (M3) and NMOS (M4) is reduced by the discharge as far as a threshold value voltage of an inverter formed by the PMOS (M3) and NMOS (M4). The output signal out being a signal wherein the output signal o1 of the first stage inverter is inverted, the delays of the rise and decay of the output signal out are switching delay times tp and tn of the PMOS (M3) and NMOS (M4). That is, the output signal out is such that the rise of the input signal in is delayed by a delay time tdx (td+tp), and its decay is the delay of a switching delay time ts (tp+tn). Herein, as the switching delay time ts (tp and tn) is determined by a transistor on resistor, gate capacitor, parasitic capacitor, and the like, it is possible, by fixing the power supply potential VDD, to set a predetermined delay time tdx by means of the delay control current signal VIb(x).

The phase difference detector circuit 2 shown in FIG. 1 detects the phase difference between a switching clock CLK-SW, which forms a basic clock of the switching power supply unit, and the delay line clock CLK-DL indicating the A/D conversion cycle, or more precisely the phase difference between the rising edges of the two, and outputs an Up signal for the period in which there is a phase difference when the phase of the switching clock CLK-SW is earlier, and outputs a Dwn signal for the period in which there is a phase difference when the phase of the switching clock CLK-SW is later.

Figure 5:
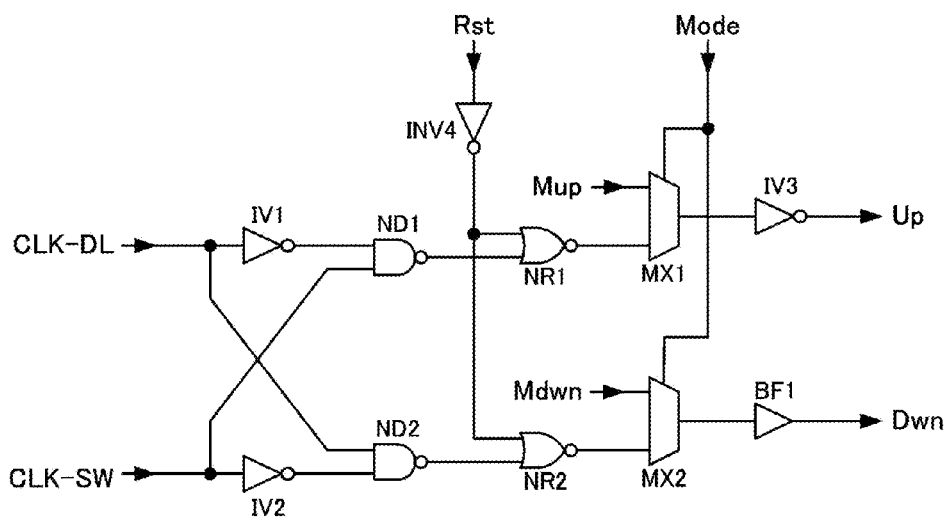
FIG. 5 is a diagram showing a circuit configuration example of a phase difference detector circuit according to the embodiment of the invention.

FIG. 5 is an example of a circuit configuration of the phase difference detector circuit 2 of the embodiment. The phase difference detector circuit 2 shown in FIG. 5 includes inverters IV1 to IV4, a buffer BF1, NAND circuits ND1 and ND2, NOR circuits NR1 and NR2, and multiplexer circuits MX 1 and MX2, wherein the Up signal (at an L level at an Up time and an H level at a steady time) is output at an inverted signal of a logical product of a CLK-SW signal and a CLK-DL inverted signal, and the Dwn signal (at an H level at a Dwn time and an L level at a steady time) is output at a logical product signal of a CLK-SW inverted signal and a CLK-DL signal.

An Rst signal is an external reset signal. Also, an Mup signal and Mdwn signal are used when manually setting the Up signal and Dwn signal from the exterior, and are used by switching between the multiplexers MX1 and MX2 with a Mode signal. Both of them are test signals, and are not used at a normal operating time.

Figure 6:
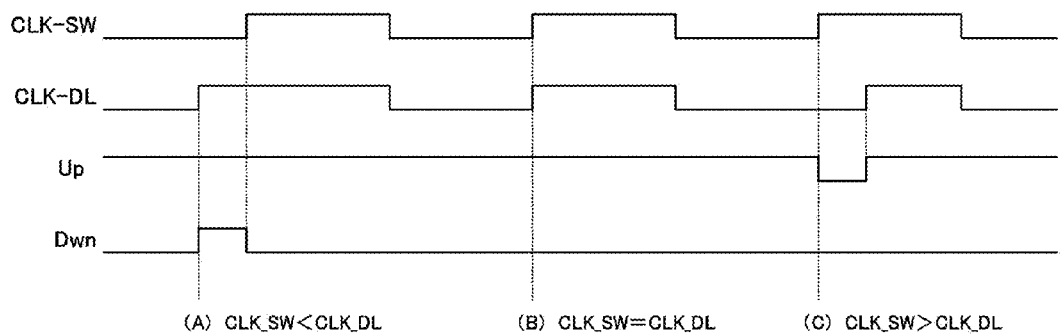
FIGS. 6A to 6C are diagrams showing a timing chart of the phase difference detector circuit according to the embodiment of the invention.

FIGS. 6A to 6C show timing charts of the phase difference detector circuit 2 shown in FIG. 5. Firstly, as shown in FIG. 6A, when the phase of the rising edge of the CLK-SW signal is later than that of the rising edge of the CLK-DL signal, the Dwn signal is output at the H level for the period by which the phase is late. Also, as shown in FIG. 6B, when the phases of the CLK-SW signal and CLK-DL signal are the same, the Up signal and Dwn signal do not change. Furthermore, as shown in FIG. 6C, when the phase of the rising edge of the CLK-SW signal is earlier than that of the rising edge of the CLK-DL signal, the Up signal is output at the L level for the period for which the phase is early.

The charge pump circuit 3 shown in FIG. 1 generates and outputs an analog voltage Bcnt signal that determines a bias current Ibias flowing through the bias current indicator circuit 4 using an input signal Bias and the Up signal and Dwn signal output from the phase difference detector circuit 2. The input signal Bias is a voltage signal generated by an unshown constant current circuit.

Figure 7:
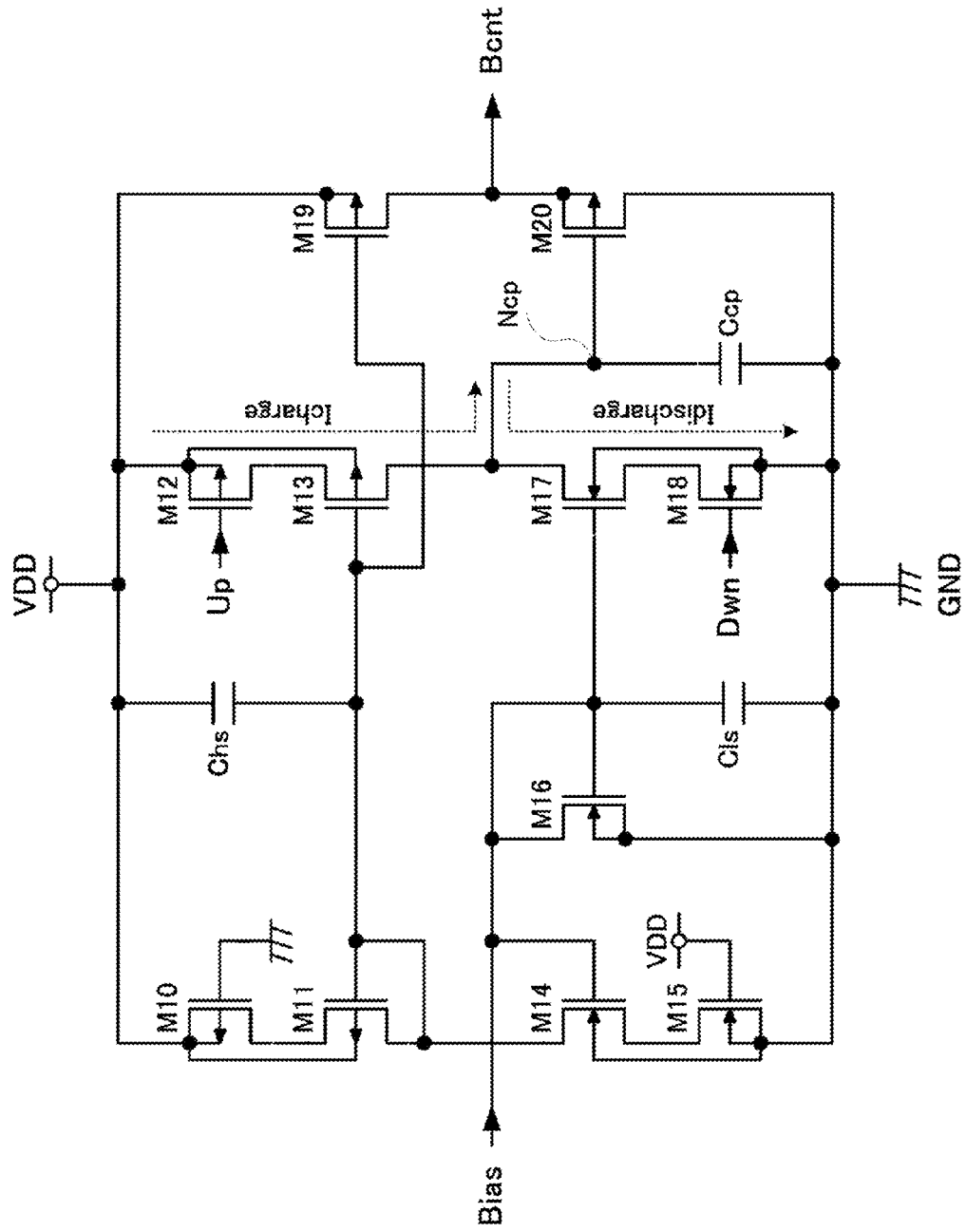
FIG. 7 is a diagram showing a circuit configuration example of a charge pump circuit according to the embodiment of the invention.

FIG. 7 is an example of a circuit configuration of the charge pump circuit 3 of the embodiment. The charge pump circuit 3 shown in FIG. 7 includes a constant current circuit that generates a reference current from the input signal Bias wherein PMOSs (M10 and M11) and NMOSs (M14 and M15) are connected in series, PMOSs (M12 and M13) configuring a charging circuit that generates a charging current Icharge by copying the reference current, and in which the turning on and off of an operation is controlled with the Up signal, an NMOS (M16) configuring the constant current circuit that generates the reference current from the input signal Bias, NMOSs (M17 and M18) configuring a discharging circuit that generates a discharge current Idischarge by copying the reference current, and in which the turning on and off of an operation is controlled with the Down signal, a charge pump capacitor Ccp, and an output circuit wherein a PMOS (M19) whose gate is connected to the gate of the PMOS (M13) and a PMOS (M20) controlled by a potential Ncp of the charge pump capacitor Ccp are connected in series. The gate of the PMOS (M20) is connected to the charge pump capacitor Ccp, and the output circuit configures a source follower circuit with respect to the potential (the integrated voltage of the capacitor Ccp) Ncp of the charge pump capacitor Ccp. Capacitors Chs and Cls are capacitors for stabilizing the gate potential of the charging circuit and discharging circuit respectively.

Next, a description will be given of an operation of the charge pump circuit 3 shown in FIG. 7. Firstly, on the Up signal (L level) being output from the phase difference detector circuit 2, the switching PMOS (M12) of the charging circuit is turned on, and the charge pump capacitor Ccp is charged by the charging current Icharge for the period of the L level. Because of this, the potential Ncp of the charge pump capacitor Ccp rises, and the voltage Bcnt output from the output circuit, which is the source follower circuit with respect to the potential Ncp, also rises. Meanwhile, on the Dwn signal (H level) being output from the phase difference detector circuit 2, the switching NMOS (M18) of the discharging circuit is turned on, and the charge pump capacitor Ccp is discharged by the discharging current Idischarge for the period of the H level. Because of this, the potential Ncp of the charge pump capacitor Ccp falls, and the voltage Bcnt output from the output circuit, which is the source follower circuit with respect to the potential Ncp also falls. In this way, the output circuit of the charge pump circuit 3 generates and outputs the output voltage Bcnt in such a way that it rises or falls for a period in which there is a phase difference in accordance with the Up signal or Dwn signal of the phase difference detector circuit 2.

The bias current indicator circuit 4 shown in FIG. 1 generates the bias current Ibias in accordance with the output current Bcnt of the charge pump circuit 3 and, based on the result of a comparison of the detected values of the bias current Ibias and output voltage Vout and the reference voltage Vref, generates and outputs the delay output current signal VIb(out) and delay reference current signal VIb(ref).

Figure 8:
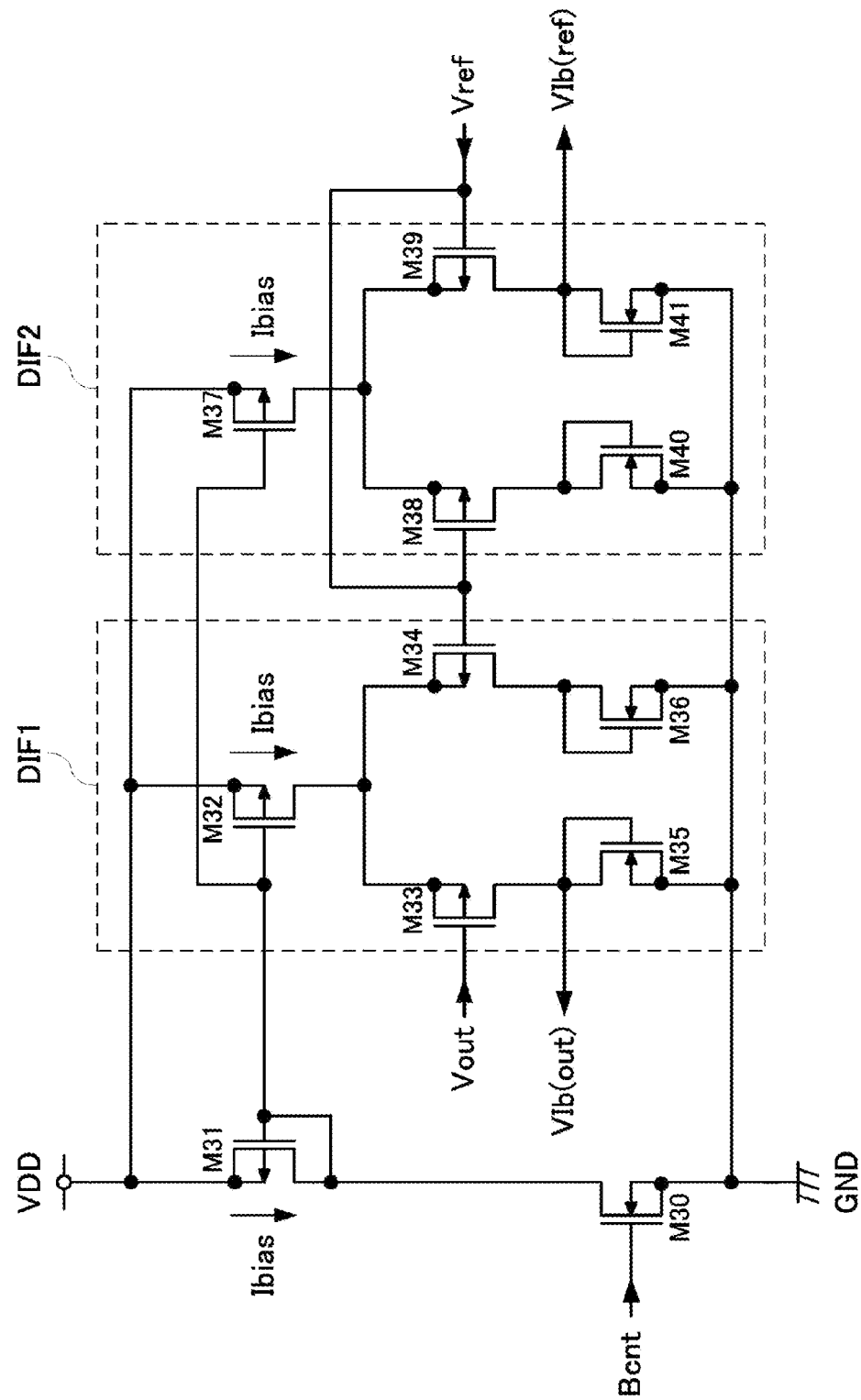
FIG. 8 is a diagram showing a circuit configuration example of a bias current indicator circuit according to the embodiment of the invention.

FIG. 8 is an example of a circuit configuration of the bias current indicator circuit 4. The bias current indicator circuit 4 shown in FIG. 8 includes a constant current circuit that generates the bias current Ibias, a differential circuit DIF1 that generates the delay output current signal VIb(out), and a differential circuit DIF2 that generates the delay reference current signal VIb(ref).

The constant current circuit includes an NMOS (M30) whose gate is controlled by the output voltage Bcnt of the charge pump circuit 3 and a PMOS (M31) whose gate and drain are commonly connected, and converts the output voltage Bcnt into the bias current Ibias.

An operating current of the two differential circuits DIF1 and DIF2 is generated by the bias current Ibias being copied in a current mirror circuit including a PMOS (M31) and PMOSs (M32 and M37), and a differential portion, two pairs of serially connected pairs of PMOSs and NMOSs being connected in parallel, includes PMOSs (M33 and M34, and M38 and M39) to which a differential input is connected, and NMOSs (M35 and M36, and M40 and M41) to which a gate and drain are commonly connected.

In FIG. 8, the differential circuit DIF2 is such that, as the reference voltage Vref is commonly connected to two differential inputs, that is, as the two differential inputs are equal, the current value indicated by the delay reference current signal VIb(ref), which is the output of the differential circuit DIF2, is Ibias/2. That is, when the delay reference current signal VIb(ref) is input into the gate of an NMOS the same size as the NMOS (M41), configuring a current mirror circuit with the NMOS and the NMOS (M41), the current flowing through the NMOS is Ibias/2. The delay reference current signal VIb(ref) is input into the delay cell array dcA2 and, by indicating the value of the delay reference current Ib(ref)

flowing through the delay elements dmyr and dr1 to dr(m) of the delay cell array dcA2, controls the delay times of these delay elements.

Figure 9:
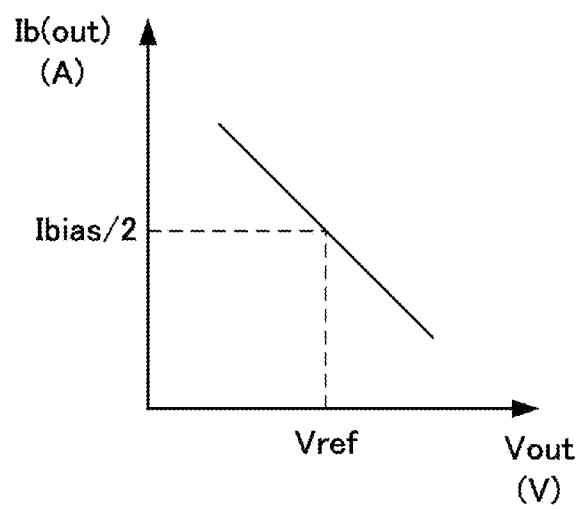
FIG. 9 is a diagram showing an example of input-output characteristics of the bias current indicator circuit according to the embodiment of the invention.

Meanwhile, the differential circuit DIF1 is such that, as the output voltage Vout and reference voltage Vref are connected to two differential inputs, the current value of the current Ib(out) indicated by the delay output current signal VIb(out), which is the output of the differential circuit DIF1, has the kind of input-output characteristics shown in FIG. 9. That is, the delay output current Ib(out), as shown below, increases and decreases centered on Ibias/2, in accordance with the potential relationship between the output voltage Vout and reference voltage Vref. Herein, the current Ib(out), when the delay output current signal VIb(out) is input into the gate of an NMOS the same size as the NMOS (M35) configuring a current mirror circuit with the NMOS and the NMOS (M35), is the current flowing through the NMOS. The delay output current signal VIb(out) is input into the delay cell array dcA1 and, by indicating the value of the delay output current Ib(out) flowing through the delay elements dmyo and do1 to do(n) of the delay cell array dcA1, controls the delay times of these delay elements.

| | |
|---|---|
| 1. When Vref<Vout | Ib(out)<Ibias/2 |
| 2. When Vref=Vout | Ib(out)=Ibias/2 |
| 3. When Vref>Vout | Ib(out)>Ibias/2 |

By generating the delay control current and delay reference current from the output voltage Vout and reference voltage Vref in this way, it is possible to control the delay times of the delay cell arrays dcA1 and dcA2.

Herein, a description will be given of an operation of the A/D converter circuit of the embodiment.

Firstly, operational waveforms of the switching clock CLK-SW, delay line clock CLK-DL and, in accordance with the phase difference of the rises of the two, the phase difference detector circuit 2, charge pump circuit 3, and bias current indicator circuit 4 are shown in FIGS. 10A to 10C.

As shown in FIG. 10A, when the phase of the rise of the switching clock CLK-SW is later than that of the rise of the delay line clock CLK-DL, the phase difference detector circuit 2 outputs the H level Dwn signal throughout the period by which the phase is late. The charge pump circuit 3 continues the discharging of the charge pump capacitor for the period of the Dwn signal, and the output voltage Bcnt falls. In the bias current indicator circuit 4, the bias current Ibias is reduced due to the voltage Bcnt falling, and the potentials of the delay output current signal VIb(out) and delay reference current signal VIb(ref) also fall. Because of this, the A/D converter circuit operates in such a way that the delay times of the delay elements Dcell configuring the delay cell arrays dcA1 and dcA2 increase, and the A/D conversion cycle is delayed.

Also, as shown in FIG. 10B, when the phases of the switching clock CLK-SW and delay line clock CLK-DL match, the Up signal and Dwn signal of the phase difference detector circuit 2 do not change, and the output voltage Bcnt of the charge pump circuit 3 and bias current Ibias of the bias current indicator circuit 4 also maintain their conditions. Then, as the delay times of the delay elements Dcell configuring the delay cell arrays dcA1 and dcA2 do not change either, the A/D conversion cycle is also maintained.

Furthermore, as shown in FIG. 10C, when the phase of the rise of the switching clock CLK-SW is earlier than that of the rise of the delay line clock CLK-DL, the phase difference detector circuit 2 outputs the L level Up signal throughout the period for which the phase is early. The charge pump circuit 3 continues the charging of the charge pump capacitor for the period of the Up signal, and the output voltage Bcnt rises. In the bias current indicator circuit 4, the bias current Ibias increases due to the voltage Bcnt rising, and the potentials of the delay output current signal VIb(out) and delay reference current signal VIb(ref) also rise. Because of this, the A/D converter circuit operates in such a way that the delay times of the delay elements Dcell configuring the delay cell arrays dcA1 and dcA2 decrease, and the A/D conversion cycle is brought forward.

In this way, the phase difference detector circuit 2, charge pump circuit 3, and bias current indicator circuit 4 carry out an operation whereby the delay line circuit 1 continues to be controlled by a continuous analog signal until the phases of the rise of the switching clock CLK-SW and the rise of the delay line clock CLK-DL match and, on the phases matching, that condition is maintained.

Figure 11:
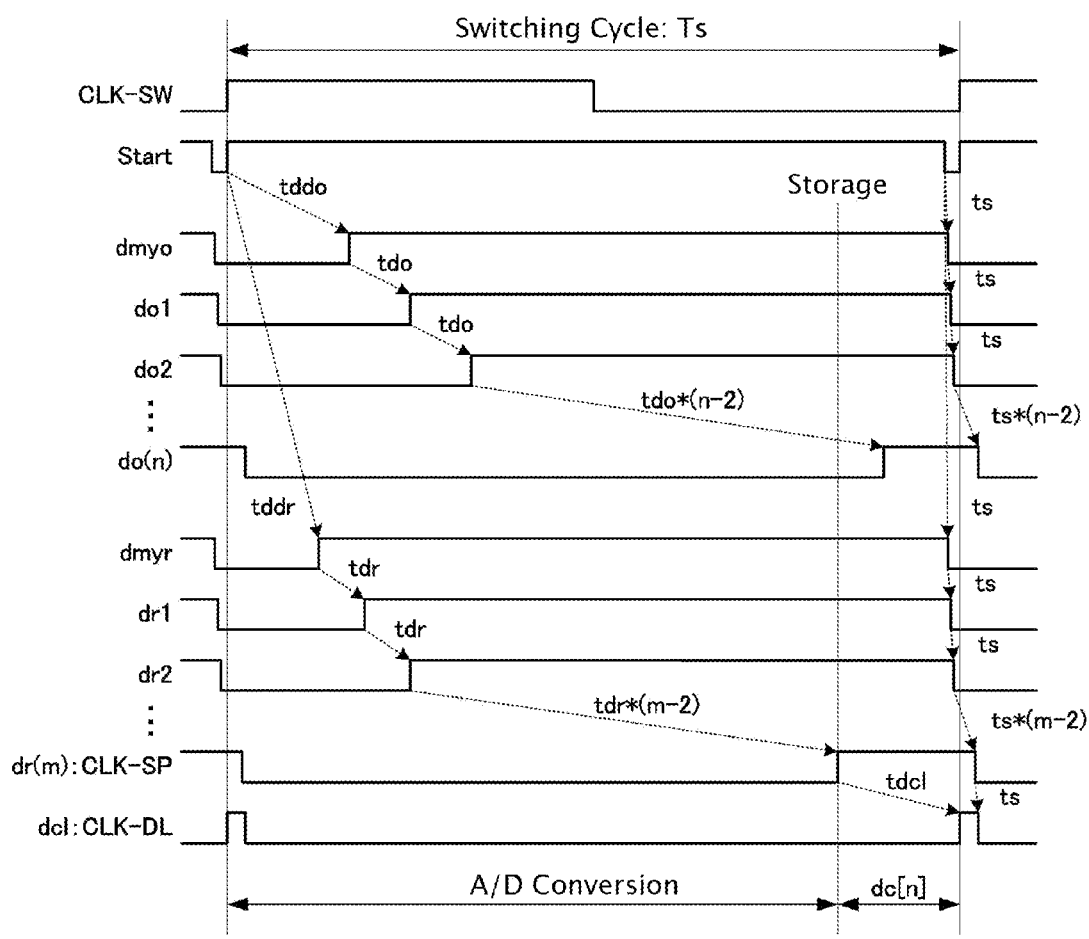
FIG. 11 is a diagram showing a timing chart of the A/D converter circuit according to the embodiment of the invention.

Next, FIG. 11 shows a timing chart of the A/D converter circuit 11 according to the invention. The switching clock CLK-SW and A/D conversion start signal Start are output as synchronous signals from an unshown control circuit. The A/D conversion operation starts at the rise of the A/D conversion start signal Start, and finishes at its decay. The A/D conversion start signal Start is input commonly into the delay cell arrays dcA1 and dcA2, and is transmitted through the delay element arrays.

Firstly, the delay cell array dcA1 is such that, the delay times of the delay elements being controlled by the delay output current signal VIb(out), on the rise of the A/D conversion start signal Start being input into the delay element dmyo, it is delayed by the delay time tddo in the delay element dmyo, transmitted to the delay element do1 at the first stage of the delay element array, then transmitted sequentially through the do1 to do(n) within the delay element array while being delayed in each delay element by the delay time tdo.

Also, the delay cell array dcA2 is such that, the delay times of the delay elements being controlled by the delay reference current signal VIb(ref), on the rise of the A/D conversion start signal Start being input into the delay element dmyr, it is delayed by the delay time tddr in the delay element dmyr, transmitted to the delay element dr1 at the first stage of the delay element array, then transmitted sequentially through the dr1 to dr(m) within the delay element array while being delayed in each delay element by the delay time tdr. Then, at a timing at which the rise of the A/D conversion start signal Start is transmitted to the delay element dr(m) and the output of the delay element dr(m) starts, that is, at a timing of the rise of the timing signal CLK-SP that stores data, the output data of the delay element array do1 to do(n) of the delay cell array dcA1 are stored in the corresponding flip-flops DFF. Furthermore, the timing signal CLK-SP, which is the output of the delay element dr(m), is transmitted to the delay element dcl, delayed by the delay time tdcl in the delay element dcl, and the delay line clock CLK-DL is output.

Next, on the A/D conversion start signal Start decaying, the delay element arrays of the delay cell arrays dcA1 and dcA2, based on that information, transmit the decay sequentially while delaying it by the delay time is in each delay element, the output of each delay element decays, and one cycle of the A/D conversion operation is completed.

Figure 10:
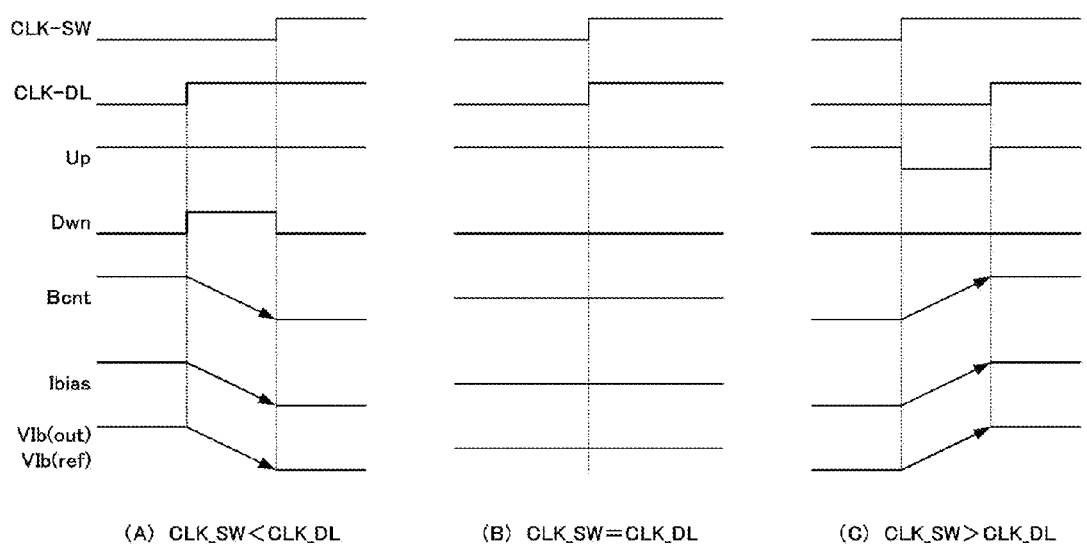
FIGS. 10A to 10C are diagrams showing operational waveforms for illustrating an operation of achieving synchronization of the A/D converter circuit according to the embodiment of the invention.

Herein, the time from the rise of the A/D conversion start signal Start to the rise of the timing signal CLK-SP is taken to be the A/D conversion time, and the time from the rise of the timing signal CLK-SP to the rise of the delay line clock CLK-DL is taken to be the duty command signal dc(n) calculation time. In the embodiment, by synchronizing the rise of the delay line clock CLK-DL indicating the finish of the A/D conversion cycle, which is the total time of the A/D conversion time and duty command signal dc(n) calculation time, with the rise of the switching clock CLK-SW, which is the basic clock of the switching cycle Ts, the securing of a temporal margin with respect to the conversion time is unnecessary, and an optimum A/D conversion operation is realized. That is, although FIG. 11 shows a condition in which synchronization is achieved, even in a condition in which synchronization is lost, such as at the time of the start-up of the switching power supply unit or when there is an effect of some kind of disturbance, the digital control switching power supply unit of the embodiment returns the condition to that of FIG. 11 by operating in such a way that the two phases match, as shown in FIG. 10, meaning that the above-mentioned margin is unnecessary.

As heretofore described, according to the digital control switching power supply unit of the invention, as the A/D converter circuit operates in such a way that the A/D conversion cycle is synchronized with the switching cycle Ts, it is unnecessary to secure a temporal margin even in the event of a frequency variation accompanying a process fluctuation, variably setting the frequency, or the like, and transient response characteristics are improved. Furthermore, as the charge pump circuit maintains its condition without operating in a steady condition wherein the A/D conversion cycle and switching cycle match, an advantage is also achieved in that it is also possible to suppress an increase in current consumption.

Heretofore, a description of an embodiment of the invention has been given but, the invention not being limited to the heretofore described embodiment, various improvements and changes are possible without departing from the scope of the invention.

This application is based on and claims priority to Japanese Patent Application 2009-278682 filed on 8 Dec. 2009. The disclosure of the priority application in its entirety, including the drawings, claims, and the specification thereof, is incorporated herein by reference.

What is claimed is:

1. A digital control switching power supply unit that converts an input voltage into a desired output voltage using a pulse width modulation signal, comprising:
    an analog-to-digital converter circuit that includes:
    a delay line circuit that has a first delay element array wherein delay elements whose delay times are controlled by a bias current are connected in series, and that converts a current value of the bias current flowing through the delay elements of the first delay element array into a digital value using a delay time of a start signal transmitted through the first delay element array;
    a phase difference detector circuit that detects a phase difference between a switching cycle fixed by the pulse width modulation signal and a cycle of an analog-to-digital conversion wherein the delay line circuit converts the current value of the bias current into the digital value;
    a charge pump circuit that generates a bias control voltage for generating the bias current in accordance with an output of the phase difference detector circuit; and
    a bias current indicator circuit that determines the bias current based on an output of the charge pump circuit, and on a result of a comparison of a detected value of the output voltage and a reference voltage.

2. The digital control switching power supply unit according to claim 1, wherein
    the delay line circuit includes:
    a first delay cell array that has the first delay element array wherein delay elements through which a delay output current flows as the bias current, and whose delay times are controlled by the delay output current, are connected in series, and a memory circuit that stores an output of the delay elements configuring the first delay element array using a timing signal;
    a second delay cell array that has a second delay element array wherein delay elements through which a delay reference current flows as the bias current, and whose delay times are controlled by the delay reference current, are connected in series, and that generates the timing signal and a signal indicating the conversion cycle; and
    an encoder circuit that encodes an output of the memory circuit.

3. The digital control switching power supply unit according to claim 1, wherein
    the phase difference detector circuit includes:
    a circuit that, with the switching cycle as a reference, detects a difference in phase with that of the conversion cycle, and outputs an Up signal for a period in which there is a phase difference when the phase of the switching cycle is earlier; and
    a circuit that, with the switching cycle as a reference, detects a difference in phase with that of the analog-to-digital conversion cycle, and outputs a Dwn signal for a period in which there is a phase difference when the phase of the switching cycle is later.

4. The digital control switching power supply unit according to claim 3, wherein
    the charge pump circuit includes:
    a charging circuit that generates a charge current by copying a reference current, and charges a charge pump capacitor with the charge current for the period for which the Up signal is being output;
    a discharging circuit that generates a discharge current by copying the reference current, and discharges the charge pump capacitor with the discharge current for the period for which the Dwn signal is being output; and
    an output circuit that outputs the bias control voltage in accordance with a charge/discharge voltage of the charge pump capacitor.

5. The digital control switching power supply unit according to claim 1, wherein
    the bias current indicator circuit includes:
    a constant current circuit that generates a constant current in accordance with the bias control voltage;
    a first differential circuit that, with a current wherein the constant current is copied as an operating current and with the detected value of the output voltage and the reference voltage as inputs, outputs a signal determining the delay output current; and
    a second differential circuit that, with a current wherein the constant current is copied as an operating current and with signals of the same potential as two inputs, outputs a signal determining the delay reference current.

6. A digital control switching power supply method that converts an input voltage into a desired output voltage using a pulse width modulation signal, comprising:
    an analog-to-digital converter step that includes:
    a delay line step that converts a current value of a bias current flowing through delay elements of a first delay element array into a digital value using a delay time of a start signal transmitted through the first delay element array;

a phase difference detector step that detects a phase difference between a switching cycle fixed by the pulse width modulation signal and a cycle of an analog-to-digital conversion wherein the delay line step converts the current value of the bias current into the digital value;

a charge pump step that generates a bias control voltage for generating the bias current in accordance with an output of the phase difference detector step; and a bias current indicator step that determines the bias current based on an output of the charge pump step, and on a result of a comparison of a detected value of the output voltage and a reference voltage.

7. The digital control switching power supply method according to claim 6, wherein the phase difference detector step includes:

a step that, with the switching cycle as a reference, detects a difference in phase with that of the conversion cycle, and outputs an Up signal for a period in which there is a phase difference when the phase of the switching cycle is earlier; and a step that, with the switching cycle as a reference, detects a difference in phase with that of the analog-to-digital conversion cycle, and outputs a Dwn signal for a period in which there is a phase difference when the phase of the switching cycle is later.

8. The digital control switching power supply method according to claim 7, wherein the charge pump step includes:

a charging step that generates a charge current by copying a reference current, and charges a charge pump capacitor with the charge current for the period for which the Up signal is being output;

a discharging step that generates a discharge current by copying the reference current, and discharges the charge pump capacitor with the discharge current for the period for which the Dwn signal is being output; and an output step that outputs the bias control voltage in accordance with a charge/discharge voltage of the charge pump capacitor.

* * * * *